(12) United States Patent
Wang et al.

(10) Patent No.: US 12,521,674 B2
(45) Date of Patent: Jan. 13, 2026

(54) $SO_2$ ADSORPTION MATERIAL, PREPARATION METHOD THEREFOR AND APPLICATION THEREOF, AND METHOD FOR REMOVING $SO_2$ FROM FLUE GAS CONTAINING $SO_2$

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

(72) Inventors: Peng Wang, Liaoning (CN); Lei Zhao, Liaoning (CN); Zhiyu Liu, Liaoning (CN); Zhongsheng Liu, Liaoning (CN); Xuehai Wang, Liaoning (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

( * ) Notice: Subject to any disclaimer, the term of this patent is extended or adjusted under 35 U.S.C. 154(b) by 920 days.

(21) Appl. No.: 17/755,539

(22) PCT Filed: Oct. 27, 2020

(86) PCT No.: PCT/CN2020/123882
§ 371 (c)(1),
(2) Date: Apr. 30, 2022

(87) PCT Pub. No.: WO2021/083109
PCT Pub. Date: May 6, 2021

(65) Prior Publication Data
US 2022/0379261 A1   Dec. 1, 2022

(30) Foreign Application Priority Data
Oct. 31, 2019   (CN) .......................... 201911048429.7

(51) Int. Cl.
| | | |
|---|---|---|
| *B01J 20/20* | (2006.01) | |
| *B01D 53/50* | (2006.01) | |
| *B01J 20/22* | (2006.01) | |
| *B01J 20/28* | (2006.01) | |
| *B01J 20/30* | (2006.01) | |
| *B01J 20/32* | (2006.01) | |

(52) U.S. Cl.
CPC .......... *B01D 53/508* (2013.01); *B01J 20/20* (2013.01); *B01J 20/226* (2013.01); *B01J 20/28066* (2013.01); *B01J 20/28076* (2013.01); *B01J 20/3078* (2013.01); *B01J 20/3225* (2013.01); *B01J 20/3248* (2013.01); *B01D 2253/102* (2013.01); *B01D 2253/204* (2013.01); *B01D 2253/25* (2013.01); *B01D 2253/306* (2013.01); *B01D 2253/311* (2013.01); *B01D 2257/302* (2013.01); *B01D 2258/0283* (2013.01)

(58) Field of Classification Search
CPC .... B01J 20/20; B01J 20/226; B01J 20/28066; B01J 20/28076; B01J 20/3078; B01J 20/3225; B01J 20/3248; B01D 53/508; B01D 2253/102; B01D 2253/204; B01D 2253/25; B01D 2253/306; B01D 2253/311
See application file for complete search history.

(56) References Cited

U.S. PATENT DOCUMENTS

| | | | |
|---|---|---|---|
| 4,075,282 A | 2/1978 | Storp et al. | |
| 5,770,537 A | 6/1998 | El-Shoubary et al. | |
| 2010/0320294 A1 | 12/2010 | Neumann et al. | |
| 2011/0088549 A1 | 4/2011 | Sayari et al. | |
| 2013/0098126 A1* | 4/2013 | Endo ................ | B01D 53/62 422/619 |

(Continued)

FOREIGN PATENT DOCUMENTS

| | | |
|---|---|---|
| CN | 104418315 A | 2/2003 |
| CN | 105727736 A | 7/2016 |

(Continued)

OTHER PUBLICATIONS

Wang, Ani et al., "N-Doped Porous Carbon Derived by Direct Carbonization of Metal-Organic Complexes Crystal Materials for SO2 Adsorption", Crystal Growth & Design, vol. 19, No. 3, Feb. 5, 2019, ISSN: 1528-7483; Abstract & pp. 1981.

(Continued)

*Primary Examiner* — Stuart L Hendrickson
(74) *Attorney, Agent, or Firm* — NKL Law; Allen Xue

(57) ABSTRACT

A $SO_2$ adsorption material, a preparation method therefor and an application thereof, and a method for removing $SO_2$ from flue gas containing $SO_2$ are provided. The $SO_2$ adsorption material contains a carbonized metal organic framework material and a sulfite loaded on the carbonized metal organic framework material, and the carbonized metal organic framework material is a carbonized material obtained by carbonizing a metal organic framework material. On the basis of the total weight of the $SO_2$ adsorption material, the loading amount of sulfite is not higher than 10 wt %. The $SO_2$ adsorption material has a relatively high $SO_2$ adsorption capacity, and may be desorbed and regenerated by heating, and the adsorption capacity still remains at a relatively high level after multiple cycles of adsorption-desorption.

10 Claims, 1 Drawing Sheet

(56) References Cited

U.S. PATENT DOCUMENTS

| | | | |
|---|---|---|---|
| 2013/0302479 | A1 | 11/2013 | Powers et al. |
| 2016/0250618 | A1 | 9/2016 | Long et al. |
| 2016/0256851 | A1 | 9/2016 | Glover |
| 2018/0104668 | A1 | 4/2018 | Tan et al. |

FOREIGN PATENT DOCUMENTS

| | | |
|---|---|---|
| CN | 109925871 A | 6/2019 |
| FR | 2139752 A1 | 1/1973 |
| JP | S5117191 A | 2/1976 |
| JP | S53119276 A | 10/1978 |
| RU | 2705340 C2 | 11/2019 |
| WO | 2017135405 A1 | 8/2017 |

OTHER PUBLICATIONS

Wang, Ani et al., "Nitrogen-Doped Microporous Carbons Derived from Pyridine Ligand-Based Metal-Organic Complexes as High-Performance SO2 Adsorption Sorbents", ACS Applied Materials & Interfaces, vol. 10, No. 43, Oct. 8, 2018, ISSN: 1944-8244; Abstract & pp. 37414.

Gonzalez, Jorge et al.; "Deuterium NMR studies of framework and guest mobility in the metal-organic framework compound MOF-5, Zn4O(O2CC6H4CO2)3"; Microporous and Mesoporous Matererials, vol. 84; 2005; pp. 97-104.

Tran, Uyen P. N. et al.; "Expanding Applications of Metal-Organic Frameworks: Zeolite Imidazolate Framework ZIF-8 as an Efficient Heterogeneous Catalyst for the Knoevenagel Reaction"; ACS Catalysis; vol. 1; 2011; pp. 120-127.

Rosi, Nathaniel L. et al.; "Rod Packings and Metal-Organic Frameworks Constructed from Rod-Shaped Secondary Building Units"; J.Am.Chem.Soc .; 2005, vol. 127, No. 5, pp. 1504-1518.

Chen, Fuqiang et al.; "Deep Desulfurization with Record SO2 Adsorption on the Metal-Organic Frameworks"; Journal of the American Chemical Society; vol. 143, Year: 2021; 9040-9047.

Shi, Yawei et al.; "MOF-Derived Porous Carbon for Adsorptive Desulfurization"; American Institute of Chemical Engineers; vol. 60, No. 8; Jun. 17, 2014; pp. 2747-2751.

Babu, Deepu J et al.; "SO2 gas adsorption on carbon nanomaterials: a comparative study"; Beilstein Journal of Nanotechnology; Jun. 13, 2018; pp. 1782-1792.

Britt, David et al.; "Metal-organic frameworks with high capacity and selectivity for harmful gases"; Proceedings of the National Academy of Sciences; vol. 105, No. 33; Aug. 19, 2008; pp. 11623-11627.

* cited by examiner

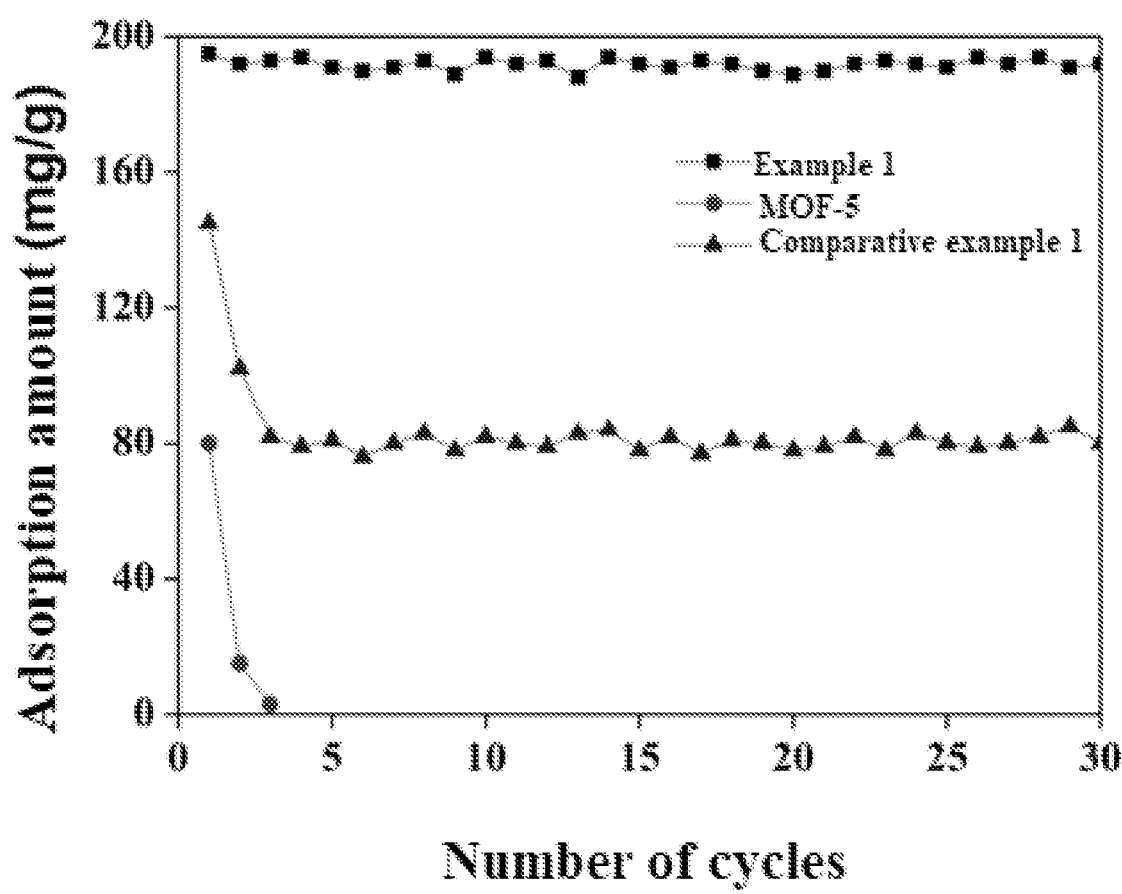

SO₂ ADSORPTION MATERIAL, PREPARATION METHOD THEREFOR AND APPLICATION THEREOF, AND METHOD FOR REMOVING SO₂ FROM FLUE GAS CONTAINING SO₂

CROSS REFERENCE TO RELATED APPLICATIONS

This application is a U.S. national stage entry of PCT international application no. PCT/CN2020/123882, filed on Oct. 27, 2020, which claims the benefit of priority of the Chinese patent application number 201911048429.7, filed on Oct. 31, 2019, the content of which is incorporated herein by reference in its entirety.

FIELD

The present disclosure relates to the field of desulfurization, in particular to a $SO_2$ adsorption material, a method for preparing the $SO_2$ adsorption material, the $SO_2$ adsorption material prepared with the method, a use of the $SO_2$ adsorption material in the field of desulfurization, and a method for removing $SO_2$ from a flue gas containing $SO_2$.

BACKGROUND

Fossil fuels (e.g., coal, oil) contain a large amount of sulfur, and the direct combustion thereof leads to high levels of $SO_2$ in the flue gas. The excessive emission of $SO_2$ causes a number of environmental problems, the formation of acid rain and photochemical smog has brought forth serious hazards to production and daily life of human being.

The most widely used methods for removing $SO_2$ at present can be categorized into the wet method desulfurization technology and the dry method desulfurization technology. Among them, the wet method desulfurization is mainly carried out by contacting an alkaline solution with the flue gas, converting $SO_2$ into the sulfite and sulfate through the chemical reactions and dissolving the sulfite and sulfate in water, and further treating the sulfate-containing solution thereby fulfilling the purpose of desulfurization. Among the industrially applied wet method desulfurization technologies, $SO_2$ in the flue gas can be absorbed by a sodium sulfite solution. In the dry method desulfurization technologies, $SO_2$ is separated from an exhaust gas by using the adsorption property of the porous materials, the $SO_2$ is adsorbed to a saturated state and then subjected to desorption and regeneration, or oxidization to $SO_3$ which is further subjected to elution. In the dry method flue gas desulfurization modes which are industrially and widely applied, $SO_2$ is removed by adsorption-oxidation-sulfation-alkaline washing process by using an activated carbon material as an adsorption oxidant.

The S-Zorb flue gas in the petroleum refining industry has a volume concentration of $SO_2$ large than 1%, given that the $SO_2$ content of the flue gas is relatively high, it is more suitable to adsorb $SO_2$ and prepare sulfur by desorbing and recycling the $SO_2$, thereby performing recycle and reuse of $SO_2$. However, a majority of the adsorption materials applied in the conventional desulfurization process has an oxidation property, which is prone to oxidize $SO_2$ to $SO_3$, thus the adsorption materials are not suitable for recycling and reusing the $SO_2$ in the S-Zorb flue gas through the adsorption-desorption process. In addition, the S-Zorb flue gas has a low content of $O_2$ (the volume concentration is typically less than 0.1%), thus the treatment mode of oxidizing $SO_2$ into $SO_3$ is not feasible. In addition, with respect to the S-Zorb flue gas containing water vapor, the existing adsorption material has a low physical adsorption capacity for $SO_2$, it cannot meet the requirement of practical use.

Therefore, it is of important and practical significance to provide a novel $SO_2$ adsorption material having a high physical adsorption capacity for 502.

SUMMARY

The present disclosure aims to overcome the defects of the prior art that the adsorption capacity of the $SO_2$ adsorption material is prone to attenuate and the physical adsorption capacity thereof is poor in the presence of water vapor.

The inventors of the present disclosure have discovered that although the metal organic framework (MOF) materials have an abundant microporous structure and a high specific surface area, the materials comprise metal oxides with metal element as the central node, and the materials are prone to carry out chemical reactions while adsorbing $SO_2$, thus the materials have poor physical adsorption capacity for $SO_2$, which is not conducive to adsorption-desorption and recycle of $SO_2$. Although the carbonized metal organic framework material obtained after the carbonization process is capable of performing physical adsorption-desorption for $SO_2$, its $SO_2$ adsorption capacity will attenuate in the presence of water vapor, particularly for S-Zorb flue gas containing water vapor, thus the physical adsorption capacity is not desirable.

The inventors of the present disclosure have performed extensive inventive researches and found that a composite material obtained by loading sulfite (e.g., sodium sulfite) on a carbonized metal organic framework material can achieve high capacity physical adsorption of $SO_2$ through synergy between the sulfite and the carbonized metal organic framework material, overcoming the defect that the $SO_2$ adsorption capacity is vulnerable to attenuate in the presence of water vapor, and the produced adsorption material can be desorbed and regenerated for reuse, and exhibit excellent recycle performance, such that the present disclosure is accomplished based on the finding.

In order to fulfill the above purpose, a first aspect of the present disclosure provides a $SO_2$ adsorption material, wherein the $SO_2$ adsorption material comprises a carbonized metal organic framework material and a sulfite loaded on the carbonized metal organic framework material, the carbonized metal organic framework material is a carbonized material obtained by subjecting a metal organic framework material to a carbonization treatment; The loading amount of sulfite is not higher than 10 wt %, on the basis of the total weight of the $SO_2$ adsorption material.

A second aspect of the present disclosure provides a method for preparing a $SO_2$ adsorption material, wherein the method comprises the following steps:

(1) subjecting the metal organic framework material to a carbonization treatment to remove at least a portion of the metal elements contained in the metal organic framework material, so as to obtain a carbonized metal organic framework material;

(2) loading sulfite on the carbonized metal organic framework material to prepare the $SO_2$ adsorption material;

said carbonized metal organic framework material and said sulfite are used in an amount such that the loading amount of sulfite is not higher than 10 wt %, on the basis of the total weight of the $SO_2$ adsorption material.

A third aspect of the present disclosure provides a $SO_2$ adsorption material prepared with the method of the second aspect.

A fourth aspect of the present disclosure provides an application of the $SO_2$ adsorption material of the first aspect or the third aspect in the field of desulfurization.

A fifth aspect of the present disclosure provides a method for removing $SO_2$ from a flue gas containing $SO_2$, wherein the method comprises the following steps:

Contacting the $SO_2$ adsorption material with the $SO_2$-containing flue gas to be treated for adsorption treatment, wherein said $SO_2$ adsorption material is the $SO_2$ adsorption material of the first aspect or the third aspect.

The present disclosure has at least the following advantages over the prior art:

(1) The $SO_2$ adsorption material provided by the present disclosure has an excellent $SO_2$ adsorption capacity, which is higher than that of the commercially available activated carbon and MOF materials under the same adsorption conditions within the penetration time.

(2) The $SO_2$ adsorption material provided by the present disclosure also exhibits excellent physical adsorption capability in the presence of water vapor, its adsorption capacity does not obviously attenuate in the presence of water vapor; in addition, the $SO_2$ adsorption material provided by the present disclosure can be recycled and reused through desorption and regeneration, and the $SO_2$ adsorption capacity still remains at a relatively high level after multiple cycles of adsorption-desorption, thus the material has important significance for solving the problem of adsorbing and recycling $SO_2$ from the flue gas of the petroleum refining industry. The other characteristics and advantages of the present disclosure will be specified in the following content of the detailed description of the preferred embodiments.

BRIEF DESCRIPTION OF THE DRAWINGS

FIG. 1 illustrates a diagram comparing the test results of 30 cycles of adsorption-desorption tests among the MOF-5, the $SO_2$ adsorption material L1 prepared in Example 1, and the $SO_2$ adsorption material D1 prepared in Comparative example 1.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As previously mentioned, a first aspect of the present disclosure provides a $SO_2$ adsorption material, wherein the $SO_2$ adsorption material comprises a carbonized metal organic framework material and a sulfite loaded on the carbonized metal organic framework material, the carbonized metal organic framework material is a carbonized material obtained by subjecting a metal organic framework material to a carbonization treatment; The loading amount of sulfite is not higher than 10 wt %, on the basis of the total weight of the $SO_2$ adsorption material.

In order to obtain a higher $SO_2$ adsorption capacity, it is preferable that the loading amount of sulfite is within a range of 2-7 wt %, on the basis of the total weight of the $SO_2$ adsorption material.

In the present disclosure, the metal organic framework material is an organic-inorganic hybrid material having an infinite topological regular pore structure, which is formed from an organic ligand and metal ions through coordination-bonding of the coordinate bonds.

According to the present disclosure, it is preferable that the metal organic framework material is a zinc-based metal organic framework material, the zinc-based metal organic framework material refers to that a metal element in the metal organic framework material is a zinc element. Preferably, the metal organic framework material is at least one selected from the group consisting of MOF-5, MOF-74, ZIF-8, ZIF-7 and ZIF-20 having a specific surface area of 800-1,800 $m^2/g$ and a pore volume of 0.8-1.2 $cm^3/g$. Thus the cooperation of the resulting carbonized metal organic framework material with sulfites enables to obtain the more desired effect of physical adsorption-desorption of $SO_2$, facilitates adsorption and recycle of $SO_2$.

Preferably, the metal organic framework material is MOF-5 having a specific surface area within a range of 1,500-1,700 $m^2/g$ and a pore volume within a range of 1-1.15 $cm^3/g$.

Preferably, the metal organic framework material contains a metal element in an amount of 20-35 wt %.

The present disclosure does not impose specific limitation in regard to the source of the metal organic framework material, which is commercially available, or may be obtained by a method of preparing the metal organic framework material in the prior art.

In the present disclosure, the carbonized metal organic framework material is a carbonized material obtained by subjecting a metal organic framework material to a carbonization treatment. The carbonization treatment process serves to reduce the content of the metal elements in the metal organic framework material, and increase the specific surface area and the pore volume of the material. The carbonized metal organic framework material obtained through the carbonization treatment maintains the advantages of regular porous cage-like topological structure, large specific surface area, and advanced pore structure of the metal organic framework material.

For example, a MOF-5 material is a porous three-dimensional material with an infinite and regular topological structure formed by assembling of the metals Zn and terephthalic acid, the material has a porosity within a range of 70%-80%, the secondary structure units are cubic crystals having a=25.6690 Å, V=16913.2 Å, an inner diameter of 15.2 Å, and a window size of 7.8. With respect to the MOF-5 having an average pore size of 1.45-1.5 nm, the regular porous cage-like topological structure and high porosity of MOF-5 are retained after the carbonization process, and the pore volume ratio for the different pore sizes is macropores (pore size larger than 50 nm): mesopores (pore size within a range of 2-50 nm): micropores (pore size smaller than 2 nm)=1: (13-15): (5-6), and the porosity is within a range of 80%-85%.

In another example, ZIF-8 is a porous three-dimensional material formed by assembling Zn and dimethyl imidazole, the material has a topological structure of SOD configuration, an internal pore size of 11.6 Å, a window of 3.4 Å, and a porosity of 35-40%. In regard to the ZIF-8 having a mean pore size of 1.07-1.15 nm, the regular porous cage-like topological structure of ZIF-8 is retained after the carbonization process, the pore volume ratio for the different pore sizes is macropores (pore size larger than 50 nm): mesopores (pore size within a range of 2-50 nm): micropores (pore size smaller than 2 nm)=1: (2-3): (16-18), and the porosity is within a range of 50-55%.

Preferably, said carbonized metal organic framework material has a regular, porous and cage-like topological structure with a bulk density of 0.2-0.35 g/cm$^3$, a specific surface area of 1,000-2,700 m$^2$/g, a pore volume of 1-3.8 cm$^3$/g, and (macropore volume+mesopore volume)/micropore volume=0.16-3.5.

More preferably, said carbonized metal organic framework material has a regular, porous and cage-like topological structure with a bulk density of 0.22-0.33 g/cm$^3$, a specific surface area of 1,025-2,650 m$^2$/g, a pore volume of 1.06-3.7 cm$^3$/g, and (macropore volume+mesopore volume)/micropore volume=2.3-3.5.

In the present disclosure, the macropores refer to the pores with a pore diameter greater than 50 nm, the mesopores refer to the pores with a pore diameter within a range of 2-50 nm, and the micropores refer to the pores with a pore diameter less than 2 nm.

Preferably, the content of metal elements in the carbonized metal organic framework material is within a range of 0-0.06 wt %, preferably 0-0.02 wt %; more preferably, the carbonized metal organic framework material obtained after the carbonization treatment does not contain metal element, but the content of metal elements in the carbonized metal organic framework material is lower than the lower limit of the analytical detection due to an inevitable measuring error.

In the present disclosure, the content of the metal element is determined through the Inductively Coupled Plasma (ICP) analytic test.

Preferably, the carbonization treatment is carried out in a protective atmosphere under a carbonization temperature of 900-1,150° C. for a carbonization time of 5-10 h.

Preferably, the SO$_2$ adsorption material has a bulk density of 0.2-0.39 g/cm$^3$, a specific surface area of 1,000-2,700 m$^2$/g, a pore volume of 1-3.7 cm$^3$/g, and (macropore volume+mesopore volume)/micropore volume=0.21-3.5.

More preferably, the SO$_2$ adsorption material has a bulk density of 0.21-0.35 g/cm$^3$, a specific surface area of 2,000-2,650 m$^2$/g, a pore volume of 2.8-3.7 cm$^3$/g, preferably 2.86-3.62 cm$^3$/g, and (macropore volume+mesopore volume)/micropore volume=2.3-3.5.

Preferably, the content of metal element introduced by the carbonized metal organic framework material in the SO$_2$ adsorption material is 0-0.06 wt %, preferably 0-0.02 wt %, based on the weight of the carbonized metal organic framework material in the SO$_2$ adsorption material; more preferably, the SO$_2$ adsorption material does not contain metal element contained in the metal organic framework material (e.g., zinc element in zinc-based metal organic framework material), but the content of metal element may be lower than the lower limit of analytical detection due to an inevitable measuring error.

In the present disclosure, the specific surface area, porosity, pore volume and pore volume distribution ratio of the materials are all determined by an analytic detection of the adsorption-desorption curve with the N$_2$ adsorption meter.

Preferably, the sulfite is sodium sulfite and/or potassium sulfite, since the inventors have found that the use of sodium sulfite and/or potassium sulfite loaded on the carbonized metal organic framework material, the synergy of sulfite and the carbonized metal organic framework material can produce a superior SO$_2$ physical adsorption effect, particularly in the presence of water vapor, the resultant adsorption material also exhibits superior adsorption effect.

The SO$_2$ adsorption material provided by the present disclosure can be recycled and reused after the desorption treatment, the present disclosure does not impose particular limitation on the conditions of desorption treatment, however, in order to enable the desorbed SO$_2$ adsorption material to retain a desired adsorption effect, it is preferable that the conditions of desorption treatment comprise: the desorption treatment is carried out at a temperature of 110-120° C. under a nitrogen gas atmosphere.

The present disclosure provides a SO$_2$ adsorption material having a higher SO$_2$ adsorption capacity, particularly in the presence of water vapor, the SO$_2$ adsorption material also can produce an excellent physical adsorption-desorption effect on the flue gas containing water vapor; the SO$_2$ adsorption capacity of the SO$_2$ adsorption material provided in the present disclosure is higher than that of the commercially available activated carbon and MOF materials under the same adsorption conditions within the penetration time; the SO$_2$ adsorption material provided by the present disclosure can be recycled and reused through desorption and regeneration, and the SO$_2$ adsorption capacity still remains at a relatively high level after multiple cycles of adsorption-desorption.

As previously mentioned, a second aspect of the present disclosure provides a method for preparing a SO$_2$ adsorption material, wherein the method comprises the following steps:

(1) subjecting the metal organic framework material to a carbonization treatment to remove at least a portion of the metal elements contained in the metal organic framework material, so as to obtain a carbonized metal organic framework material;

(2) loading sulfite on the carbonized metal organic framework material to prepare the SO$_2$ adsorption material;

said carbonized metal organic framework material and said sulfite are used in an amount such that the loading amount of sulfite is not higher than 10 wt %, on the basis of the total weight of the SO$_2$ adsorption material.

In the method according to the second aspect of the present disclosure, in order to obtain a higher SO$_2$ adsorption capacity, it is preferable that the carbonized metal organic framework material and the sulfite are used in an amount such that the loading amount of sulfite in the SO$_2$ adsorption material is within a range of 1-7 wt %, on the basis of the total weight of the SO$_2$ adsorption material.

According to the present disclosure, it is preferable that varying loading amount of the sulfite is achieved by adjusting the concentration of the sulfite solution.

According to the method of the second aspect of the present disclosure, it is preferable that the carbonization treatment in step (1) is carried out in a protective atmosphere under a carbonization temperature of 900-1,150° C. for a carbonization time of 5-10 h. Under this condition, 99.94-100 wt % of the metal element in the metal organic framework material can be removed; more preferably, the carbonized metal organic framework material after the carbonization treatment does not contain metal element.

According to the method of the second aspect of the present disclosure, the carbonization treatment has the same function as that of the previously described first aspect, and the obtained properties of the carbonized metal organic framework material (e.g., the content of metallic elements, the specific surface area, the pore volume) are correspondingly identical to those of the carbonized metal organic framework material described above in connection with the first aspect, and the content will not be repeated here.

According to the method of the second aspect of the present disclosure, it is preferable that the protective atmosphere is provided by at least one substance selected from the group consisting of nitrogen gas, argon gas, helium gas and neon gas.

According to a preferred embodiment of the present disclosure, the modes of loading sulfite on the carbonized metal organic framework material in step (2) comprise impregnating the carbonized metal organic framework material with a sulfite solution, and drying the impregnated carbonized metal organic framework material to remove the solvent.

Preferably, the sulfite solution has a mass concentration less than 6%, more preferably within a range of 1.2-4%; the inventors have discovered that a more desired loading effect can be obtained by loading the carbonized metal organic framework material with sulfite solution having a mass concentration within the range.

Preferably, the impregnation time is 1-5 h.

In order to obtain a $SO_2$ adsorption material with better adsorptive properties, preferably the impregnation is an equal volume impregnation.

Preferably, the drying is carried out in an inert atmosphere, the drying temperature is within a range of 100-120° C., and the drying time is within a range of 6-10 h.

According to the disclosure, the inert atmosphere comprises nitrogen gas and an inert gas; the inert atmosphere is preferably provided by at least one substance selected from the group consisting of nitrogen gas, argon gas, helium gas and neon gas.

According to the method of the second aspect of the present disclosure, the sulfite is preferably sodium sulfite and/or potassium sulfite.

According to the method of the second aspect of the present disclosure, it is preferable that the metal organic framework material is selected from zinc-based metal organic framework materials.

According to the method of the second aspect of the present disclosure, it is more preferable that the metal-organic framework material is at least one selected from the group consisting of MOF-5, MOF-74, ZIF-8, ZIF-7 and ZIF-20 having a specific surface area of 800-1,800 $m^2/g$ and a pore volume of 0.8-1.2 $cm^3/g$. Thus the cooperation of the resulting carbonized metal organic framework material with sulfites enables to obtain the more desired effect of physical adsorption-desorption of $SO_2$, facilitates adsorption and recycle of $SO_2$.

According to the method of the second aspect of the present disclosure, it is further preferred that the metal organic framework material is MOF-5 having a specific surface area within a range of 1,500-1,700 $m^2/g$ and a pore volume within a range of 1-1.15 $cm^3/g$.

The present disclosure provides a method for obtaining a $SO_2$ adsorption material having an excellent physical adsorption effect of $SO_2$ by loading sulfite on the carbonized metal organic framework material, and the operations of preparation method are simple, thus the method is of important significance for solving the problem of adsorbing and recycling $SO_2$ from the flue gas of the petroleum refining industry.

As previously mentioned, a third aspect of the disclosure provides a $SO_2$ adsorption material prepared with the method of the second aspect.

The $SO_2$ adsorption material prepared with the method of the present disclosure has a high $SO_2$ adsorption capacity, particularly in the presence of water vapor, and has an excellent $SO_2$ adsorption capacity for $SO_2$-containing flue gas including water vapor; the material exhibits a higher $SO_2$ adsorption capacity than the commercial activated carbon and the MOF materials under the same adsorption conditions within the penetration time; in addition, the $SO_2$ adsorption material provided by the present disclosure can be regenerated by heating and desorption, and the adsorption capacity still remains at a relatively high level after multiple cycles of adsorption-desorption.

As previously described, a fourth aspect of the present disclosure provides an application of the $SO_2$ adsorption material of the first aspect or third aspect in the field of desulfurization.

The present disclosure does not impose special limitation to the particular operation of the application, the operation may be carried out by using the existing operation of removing $SO_2$ in the art, and those skilled in the art should not be construed as limitation in regard to the present disclosure.

As previously mentioned, a fifth aspect of the present disclosure provides a method for removing $SO_2$ from a flue gas containing $SO_2$, wherein the method comprises the following steps:

Contacting the $SO_2$ adsorption material with the $SO_2$-containing flue gas to be treated for adsorption treatment, wherein said $SO_2$ adsorption material is the $SO_2$ adsorption material of the first aspect or the third aspect.

In the fifth aspect of the disclosure, the $SO_2$ adsorption material has the same properties as the aforementioned $SO_2$ adsorption material, and the present disclosure will not repeatedly explain the properties of the $SO_2$ adsorption material, such as specific surface area and pore volume.

Preferably, the conditions of the adsorption treatment comprise an adsorption temperature within a range of 5-25° C., an adsorption volumetric hourly space velocity of 100-1,000 $h^{-1}$, and an adsorption pressure within a range of 0-0.3 MPa, more preferably 0.1-0.3 MPa.

In the present disclosure, the adsorption volumetric hourly space velocity refers to the amount (volume) of adsorbed gas ($SO_2$-containing flue gas) passed per unit volume of adsorbent in a unit time.

Preferably, the $SO_2$-containing flue gas to be treated has a volumetric content of $SO_2$ more than 1%, more preferably 1-5%; the water vapor has a volumetric content of 1-4%.

Preferably, the $SO_2$-containing flue gas is the S-Zorb flue gas from the petrochemical refining industry.

The present disclosure provides a desulfurization method having high adsorption capacity for $SO_2$ in the flue gas by employing the $SO_2$ adsorption material of the present disclosure, which is effective for physically removing $SO_2$ in the flue gas, and can subject to cyclic adsorption and desorption, thus it is of significant importance in the adsorption and recycle of $SO_2$ from flue gas in the petroleum refining industry.

Unless otherwise specified in the present disclosure, the pressure refers to the gauge pressure, and the normal pressure is 0 MPa.

The present disclosure will be described in detail with reference to examples.

In the following examples, the raw materials used were commercially available products unless otherwise specified.

The metal organic framework materials MOF-5, ZIF-8 and MOF-74 are all self-made according to the methods disclosed in the prior literature (*Microporous Mesoporous mater.* 84 (2005) 97-104; *ACS Catal.* 2011, 1, 120-127; *J. Am. Chem. Soc.* 2005, 127, 5, 1504-1518).

In the following examples, the relevant properties were obtained by the following method:
(1) specific surface area, pore volume, and pore volume distribution ration of the material were determined by an analytic detection of the adsorption-desorption curve with the $N_2$ adsorption meter;
(2) the content of metal element was determined through the ICP analytic test;
(3) $SO_2$ content in the gas was measured by Emerson X-STREAM instrument analysis;
(4) measurement of the loading amount was obtained through conversion of the content of Na element in the adsorption material determined through the ICP analytic test.
(5) in the following example, the penetration time was set when the concentration of $SO_2$ at the adsorption outlet reached 50 mg/m³, and the $SO_2$ adsorption capacity was calculated based on the following formula:

$$Q = \frac{\sum_{i=1}^{n}\left[q \times \int_0^t (C_0 - C_i)dt\right] \times 10^{-3}}{m}$$

wherein Q denoted sulfur capacity ($SO_2$ adsorption capacity), mg/g; q denoted total flow rate of the mixed gas at an inlet, L/min; $C_0$ denoted the $SO_2$ concentration at an inlet, mg/L; $C_i$ denoted the $SO_2$ concentration at an outlet for the $i^{th}$ sampling, mg/L; t denoted the $i^{th}$ sampling time, min; n denoted the sampling number when adsorption reached saturation or a specified penetration time; m denoted the loading amount of said adsorption material, g;
(6) bulk density: calculated and obtained by measuring the volume per unit mass of adsorption material.

Example 1

The material MOF-5 having a specific surface area of 1,655 m²/g and a pore volume of 1.13 cm³/g and a Zn element content of 31.2 wt % was used as a matrix.
(1) The MOF-5 matrix was subjected to carbonizing at 1,000° C. for 6 h in the presence of nitrogen gas, so as to obtain a carbonized metal organic framework material, having a bulk density of 0.22 g/cm³, a specific surface area of 2,650 m²/g, a pore volume of 3.7 cm³/g, a content of Zn element being 0 wt %, and (macropore volume+mesopore volume)/micropore volume=3.2.
(2) The carbonized metal organic framework material was placed in a sodium sulfite solution having a mass concentration of 3%, and subjected to an equivalent-volume impregnation for 1 h, the impregnated material was subjected to drying under a nitrogen gas atmosphere at 120° C. for 6 h, so as to prepare the $SO_2$ adsorption material L1.

Upon measurement, the prepared $SO_2$ adsorption material L1 had a loading amount of sodium sulfite of 5 wt %, a bulk density of 0.231 g/cm³, a specific surface area of 2,426 m²/g, a pore volume of 3.27 cm³/g, (macropore volume+mesopore volume)/micropore volume=3.1, and a content of Zn element being 0 wt %.

Example 2

The $SO_2$ adsorption material was prepared with a similar manner as that in Example 1, except that in step (2), the carbonized metal organic framework material was placed in a sodium sulfite solution having a mass concentration of 1.2%, and subjected to an equivalent-volume impregnation, so as to prepare the $SO_2$ adsorption material L2.

Upon measurement, the prepared $SO_2$ adsorption material L2 had a loading amount of sodium sulfite of 1 wt %, a bulk density of 0.222 g/cm³, a specific surface area of 2,615 m²/g, a pore volume of 3.62 cm³/g, (macropore volume+mesopore volume)/micropore volume=3.2, and a content of Zn element being 0 wt %.

Example 3

The $SO_2$ adsorption material was prepared with a similar manner as that in Example 1, except that in step (2), the carbonized metal organic framework material was placed in a sodium sulfite solution having a mass concentration of 4%, and subjected to an equivalent-volume impregnation, so as to prepare the $SO_2$ adsorption material L3.

Upon measurement, the prepared $SO_2$ adsorption material L3 had a loading amount of sodium sulfite of 7 wt %, a bulk density of 0.235 g/cm³, a specific surface area of 2,320 m²/g, a pore volume of 3.05 cm³/g, (macropore volume+mesopore volume)/micropore volume=3.35, and a content of Zn element being 0 wt %.

Example 4

The $SO_2$ adsorption material was prepared with a similar manner as that in Example 1, except that in step (2), the carbonized metal organic framework material was placed in a sodium sulfite solution having a mass concentration of 5.8%, and subjected to an equivalent-volume impregnation, so as to prepare the $SO_2$ adsorption material L4;

Upon measurement, the prepared $SO_2$ adsorption material L4 had a loading amount of sodium sulfite of 10 wt %, a bulk density of 0.242 g/cm³, a specific surface area of 2,110 m²/g, a pore volume of 2.86 cm³/g, (macropore volume+mesopore volume)/micropore volume=3.4, and a content of Zn element being 0 wt %.

Example 5

The material ZIF-8 having a specific surface area of 1,150 m²/g and a pore volume of 0.82 cm³/g and a Zn element content of 30.7 wt % was used as a matrix.
(1) The ZIF-8 matrix was subjected to carbonizing at 1,150° C. for 5 h in the presence of nitrogen gas, so as to obtain a carbonized metal organic framework material, the obtained carbonized metal organic framework material had a bulk density of 0.28 g/cm³, a specific surface area of 1,290 m²/g, a pore volume of 1.27 cm³/g, a content of Zn element being 0 wt %, and (macropore volume+mesopore volume)/micropore volume=0.25.
(2) The carbonized metal organic framework material was placed in a sodium sulfite solution having a mass concentration of 3%, and subjected to an equivalent-volume impregnation for 1 h, the impregnated material was subjected to drying under a nitrogen gas atmosphere at 120° C. for 6 h, so as to prepare the $SO_2$ adsorption material L5.

Upon measurement, the prepared $SO_2$ adsorption material L5 had a loading amount of sodium sulfite of 5 wt %, a bulk density of 0.294 g/cm³, a specific surface area of 1,225 m²/g, a pore volume of 1.24 cm³/g, (macropore volume+mesopore volume)/micropore volume=0.255, and a content of Zn element being 0 wt %.

Example 6

The material MOF-74 having a specific surface area of 852 m$^2$/g and a pore volume of 1.02 cm$^3$/g and a Zn element content of 29.2 wt % was used as a matrix.

(1) The MOF-74 matrix was subjected to carbonizing at 900° C. for 10 h in the presence of nitrogen gas, so as to obtain a carbonized metal organic framework material, the obtained carbonized metal organic framework material had a bulk density of 0.33 g/cm$^3$, a specific surface area of 1,080 m$^2$/g, a pore volume of 1.06 cm$^3$/g, a content of Zn element being 0 wt %, and (macropore volume+mesopore volume)/micropore volume=0.22.

(2) The carbonized metal organic framework material was placed in a sodium sulfite solution having a mass concentration of 3%, and subjected to an equivalent-volume impregnation for 1 h, the impregnated material was subjected to drying under a nitrogen gas atmosphere at 120° C. for 6 h, so as to prepare the SO$_2$ adsorption material L6;

Upon measurement, the prepared SO$_2$ adsorption material L6 had a loading amount of sodium sulfite of 5 wt %, a bulk density of 0.346 g/cm$^3$, a specific surface area of 1,025 m$^2$/g, a pore volume of 1 cm$^3$/g, (macropore volume+mesopore volume)/micropore volume=0.226, and a content of Zn element being 0 wt %.

Comparative Example 1

The material MOF-5 having a specific surface area of 1,655 m$^2$/g and a pore volume of 1.13 cm$^3$/g and a Zn element content of 31.2 wt % was used as a matrix.

The MOF-5 matrix was subjected to carbonizing at 1,000° C. for 6 h in the presence of nitrogen gas, so as to obtain the SO$_2$ adsorption material D1.

Upon measurement, the prepared material D1 had a bulk density of 0.22 g/cm$^3$, a specific surface area of 2,650 m$^2$/g, a pore volume of 3.7 cm$^3$/g, (macropore volume+mesopore volume)/micropore volume=3.2, and a content of Zn element being 0 wt %.

Comparative Example 2

The commercially available activated carbon material (with a bulk density 0.62 g/cm$^3$, a specific surface area of 865 m$^2$/g, a pore volume of 0.52 cm$^3$/g) was placed in a sodium sulfite solution having a mass concentration of 3%, and subjected to an equivalent-volume impregnation for 1 h, the impregnated material was subjected to drying under a nitrogen gas atmosphere at 120° C. for 6 h, so as to prepare the SO$_2$ adsorption material D2.

Upon measurement, the prepared SO$_2$ adsorption material D2 had a loading amount of sodium sulfite of 5 wt %, a bulk density of 0.65 g/cm$^3$, a specific surface area of 820 m$^2$/g, a pore volume of 0.5 cm$^3$/g, and (macropore volume+mesopore volume)/micropore volume=0.2.

Comparative Example 3

The SO$_2$ adsorption material was prepared with a similar manner as that in Example 1, except that in step (2), the carbonized metal organic framework material was placed in a sodium sulfite solution having a mass concentration of 6.5%, and subjected to an equivalent-volume impregnation, so as to prepare the SO$_2$ adsorption material D3.

Upon measurement, the prepared material D3 had a loading amount of sodium sulfite of 13.2 wt %, a bulk density of 0.25 g/cm$^3$, a specific surface area of 1,245 m$^2$/g, a pore volume of 1.08 cm$^3$/g, (macropore volume+mesopore volume)/micropore volume=3.55, and a content of Zn element being 0 wt %.

Comparative Example 4

The material MOF-5 was directly placed in a sodium sulfite solution having a mass concentration of 3%, and subjected to an equivalent-volume impregnation for 1 h without subjected to the carbonization treatment, but the material MOF-5 was structurally decomposed and collapsed after being placed in the sodium sulfite solution, an adsorption material cannot be prepared and the subsequent operation cannot be performed.

Test Example 1

The adsorption properties of the SO$_2$ adsorption materials prepared in the Examples and Comparative Examples were tested respectively.

Wherein the SO$_2$-containing flue gas to be treated was the S-Zorb flue gas comprising water vapor, wherein the SO$_2$ content was 3% by volume and the water vapor content was 3% by volume.

The SO$_2$-containing flue gas to be treated as described above was subjected to adsorption treatment by using the SO$_2$ adsorption materials MOF-5, ZIF-8, MOF-74, activated carbon, and the SO$_2$ adsorption materials prepared in the Examples and Comparative Examples.

The conditions of the adsorption treatment included an adsorption temperature of 20° C., an adsorption volumetric hourly space velocity of 800 h$^1$, and an adsorption pressures were normal pressure and 0.2 MPa respectively.

The penetration time was set when the concentration of SO$_2$ at the adsorption outlet reached 50 mg/m$^3$, the specific measurement results were shown in Table 1.

TABLE 1 adsorption capacities of different SO$_2$ adsorption materials

| Adsorption materials | Matrix (framework Material) | Loading amount/wt % | Adsorption capacity (mg/g) | |
|---|---|---|---|---|
| | | | Condition of normal pressure | 0.2 MPa |
| MOF-5 | — | — | 34 | 80 |
| ZIF-8 | — | — | 33 | 77 |
| MOF-74 | — | — | 31 | 72 |
| Activated carbon | — | — | 30 | 70 |
| Example 1 | MOF-5 | 5 | 70 | 195 |
| Comparative example 1 | MOF-5 | — | 51 | 145 |
| Comparative example 2 | Activated carbon | 5 | 35 | 105 |
| Example 2 | MOF-5 | 1 | 55 | 150 |
| Example 3 | MOF-5 | 7 | 68 | 190 |
| Example 4 | MOF-5 | 10 | 60 | 160 |
| Example 5 | ZIF-8 | 5 | 50 | 145 |
| Example 6 | MOF-74 | 5 | 46 | 135 |
| Comparative example 3 | MOF-5 | 13.2 | 28 | 65 |
| Comparative example 4 | MOF-5 | — | — | — |

As can be seen from Table 1, the SO$_2$ adsorption materials provided by the present disclosure have high SO$_2$ adsorption capacity; and their SO$_2$ adsorption capacity is higher than that of the commercially available activated carbon and MOF materials under the same adsorption conditions within the penetration time; in particular, wherein a portion of the adsorption materials have the SO$_2$ adsorption capacity which is 2.3 times or more of the commercially available activated carbon, or 2 times or more of the MOF materials.

In particular, as illustrated by a comparison between the Examples 1~4 and the Comparative example 3, the SO$_2$ adsorption capacity is significantly decreased when the loading amount of sulfite exceeds 10 wt %; it is particularly preferred that the SO$_2$ adsorption material has a higher adsorption capacity when the loading amount of sulfite (e.g., sodium sulfite) is 2-7 wt %.

Test Example 2

The adsorption properties of the SO$_2$ adsorption materials prepared in the Examples and Comparative Examples under different pressure and temperature conditions were tested respectively.

Wherein the SO$_2$-containing flue gas to be treated was the S-Zorb flue gas comprising water vapor, wherein the SO$_2$ content was 2% by volume and the water vapor content was 4% by volume.

The conditions of the adsorption treatment comprised: an adsorption volumetric hourly space velocity of 1,000 h$^1$, and the adsorption temperatures and pressures were specifically illustrated in Table 2 below.

The penetration time was set when the concentration of SO$_2$ at the adsorption outlet reached 50 mg/m$^3$. The present disclosure exemplarily provided the test results for the SO$_2$ adsorption materials prepared in Example 1 and Comparative example 2, the specific test results were shown in Table 2 and Table 3, respectively.

TABLE 2

SO$_2$ adsorption capacity for L1 under various temperatures and pressures

| Material type | Temperature | Adsorption capacity (mg/g) | | | |
| --- | --- | --- | --- | --- | --- |
| | | Normal pressure | 0.1 MPa | 0.2 MPa | 0.3 MPa |
| L1 | 5° C. | 75 | 130 | 205 | 265 |
| | 15° C. | 72 | 125 | 195 | 245 |
| | 25° C. | 70 | 123 | 192 | 238 |

TABLE 3

SO$_2$ adsorption capacity for D2 under various temperatures and pressures

| Material type | Temperature | Adsorption capacity (mg/g) | | | |
| --- | --- | --- | --- | --- | --- |
| | | Normal pressure | 0.1 MPa | 0.2 MPa | 0.3 MPa |
| D2 | 5° C. | 40 | 90 | 115 | 168 |
| | 15° C. | 38 | 85 | 110 | 152 |
| | 25° C. | 35 | 82 | 107 | 145 |

As can be seen from a comparison of the results in Table 2 and Table 3, the SO$_2$ adsorption materials provided by the present disclosure have a high SO$_2$ adsorption capacity.

Moreover, as illustrated in Table 2, the SO$_2$ adsorption capacity of the adsorption material provided by the present disclosure can be increased by 1.7-3.5 times under the conditions consisting of the same temperature and the pressurized condition, while the temperature within a range of 5-25° C. under the same pressure condition does not impose an obvious influence on the SO$_2$ adsorption capacity of the adsorption material.

Test Example 3

The cyclic adsorption-desorption properties of the adsorption materials prepared in the Examples and Comparative Examples were measured.

Wherein the SO$_2$-containing flue gas to be treated was the S-Zorb flue gas comprising water vapor, wherein the SO$_2$ content was 5% by volume and the water vapor content was 4% by volume.

The conditions of the adsorption treatment comprised: an adsorption temperature of 20° C., an adsorption volumetric hourly space velocity of 400 h$^1$, and an adsorption pressure of 0.2 MPa. The penetration time was set when the concentration of SO$_2$ at the adsorption outlet reached 50 mg/m$^3$.

The SO$_2$ adsorption materials followed the adsorption treatment were subjected to desorption treatment at 120° C. under the nitrogen gas atmosphere, and 30 cycles of adsorption-desorption tests were carried out.

The present disclosure exemplarily provides test results of cyclic adsorption-desorption of the material MOF-5, the adsorption material L1 prepared in Example 1, and the adsorption material D1 prepared in Comparative example 1, the specific results were shown in FIG. 1.

As can be seen from FIG. 1, the SO$_2$ adsorption materials provided by the present disclosure have excellent SO$_2$ adsorption capacity, its adsorption capacity does not obviously attenuate in the presence of water vapor, and exhibits an excellent recycling performance, and the SO$_2$ adsorption capacity can maintain 85 wt. % or more of the initial adsorption capacity after 30 cycles of adsorption-desorption tests. In contrast, the SO$_2$ adsorption capacities of both the material MOF-5 and the adsorption material D1 prepared in Comparative example 1 are remarkably and significantly reduced during the cyclic tests.

To sum up, the SO$_2$ adsorption materials provided by the present disclosure have excellent SO$_2$ adsorption capacity, particularly under the condition of the flue gas containing water vapor, its adsorption capacity does not obviously attenuate in the presence of water vapor, and exhibit desirable physical adsorption effect on the SO$_2$ in the flue gas containing water vapor; the SO$_2$ adsorption capacity is higher than that of the commercially available activated carbon and MOF materials under the same adsorption conditions within the penetration time; in addition, the SO$_2$ adsorption materials provided by the present disclosure can be regenerated by heating and desorption, and the adsorption capacity still remains at a relatively high level after multiple cycles of adsorption-desorption, for example, the SO$_2$ adsorption capacity can maintain 85 wt. % or more of the initial adsorption capacity after 30 cycles of adsorption-desorption tests, thus the SO$_2$ adsorption materials have a widespread application prospect.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method for preparing a $SO_2$ adsorption material, comprising:
    step A: subjecting a metal organic framework material to a carbonization treatment to remove at least a portion of metal elements contained in the metal organic framework material, so as to obtain a carbonized metal organic framework material; and
    step B: loading sulfite on the carbonized metal organic framework material to obtain the $SO_2$ adsorption material, wherein the carbonized metal organic framework material and the sulfite are used in an amount such that an amount of sulfite in the $SO_2$ adsorption material is in a range of 1 wt % to 10 wt %, on the basis of the total weight of the $SO_2$ adsorption material.

2. The method of claim 1, wherein the carbonization treatment in step A is carried out in a protective atmosphere under a carbonization temperature of 900-1,150° C. for a carbonization time of 5-10 h.

3. The method of claim 1, wherein step B comprises impregnating the carbonized metal organic framework material with a solution comprising the sulfite, and drying the impregnated carbonized metal organic framework material.

4. The method of claim 3, wherein the sulfite solution has a mass concentration of less than 6%.

5. The method of claim 3, wherein the drying is carried out in an inert atmosphere, the drying temperature is within a range of 100-120° C., and the drying time is within a range of 6-10 h.

6. The method of claim 1, wherein the sulfite is sodium sulfite, potassium sulfite, or a mixture thereof.

7. The method of claim 1, wherein the metal organic framework material is a zinc-based metal organic framework material.

8. The method of claim 1, wherein the carbonized metal organic framework material and the sulfite are used in an amount such that the leading-amount of sulfite in the $SO_2$ adsorption material is 2-7 wt %, on the basis of the total weight of the $SO_2$ adsorption material.

9. The method of claim 1, wherein the metal organic framework material is at least one selected from the group consisting of MOF-5, MOF-74, ZIF-8, ZIF-7, and ZIF-20.

10. The method of claim 1, wherein the metal organic framework material is MOF-5 having a specific surface area within a range of 1,500-1,700 $m^2/g$ and a pore volume within a range of 1-1.15 $cm^3/g$.

* * * * *